(12) United States Patent
Denner et al.

(10) Patent No.: US 10,253,805 B2
(45) Date of Patent: Apr. 9, 2019

(54) SELF-LUBRICATING KING PIN JOINT WITH HOLLOW KING PIN

(71) Applicant: Dana Heavy Vehicle Systems Group, LLC, Maumee, OH (US)

(72) Inventors: Edward Denner, Northville, MI (US); Steven G. Slesinski, Ann Arbor, MI (US); Harry W. Trost, Royal Oak, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 15/676,534

(22) Filed: Aug. 14, 2017

(65) Prior Publication Data

US 2019/0048921 A1    Feb. 14, 2019

(51) Int. Cl.
| | |
|---|---|
| *F16C 11/04* | (2006.01) |
| *F16C 33/10* | (2006.01) |
| *B62D 7/18* | (2006.01) |
| *F16C 33/74* | (2006.01) |

(52) U.S. Cl.
CPC ............ *F16C 11/045* (2013.01); *B62D 7/18* (2013.01); *F16C 33/102* (2013.01); *F16C 33/74* (2013.01); *F16C 2326/24* (2013.01)

(58) Field of Classification Search
CPC .......... B62D 7/18; F16C 33/10; F16C 33/102; F16C 2326/24; B60L 11/002; B60G 13/14
USPC .................................................. 280/93.512
See application file for complete search history.

(56) References Cited

U.S. PATENT DOCUMENTS

| | | | | |
|---|---|---|---|---|
| 1,373,033 A | * | 3/1921 | Thomas | B60K 17/306 |
| | | | | 280/93.512 |
| 1,384,309 A | * | 7/1921 | Druar | B62D 7/18 |
| | | | | 280/93.512 |
| 1,694,681 A | * | 12/1928 | Bush | B62D 7/18 |
| | | | | 384/396 |
| 1,752,844 A | * | 4/1930 | Harrison | B60G 13/14 |
| | | | | 188/267 |
| 1,967,614 A | | 7/1934 | Gits | |

(Continued)

FOREIGN PATENT DOCUMENTS

CN    205136352 U    4/2016

OTHER PUBLICATIONS

European Patent Office, European Search Report in Application No. 18188361.2, dated Feb. 14, 2019, 8 pages. European Patent Office, The Hauge, Netherlands.

*Primary Examiner* — Frank B Vanaman
(74) *Attorney, Agent, or Firm* — Marshall & Melhorn, LLC

(57) ABSTRACT

A self-lubricating king pin joint system has a bushing within a knuckle, with a hollow king pin positioned through a center of the bushing, thereby forming a king pin joint between the bushing and the king pin. A controllable spring is positioned in and near the center of the hollow interior of the king pin, where upper and lower pistons are positioned on opposite ends of the spring. An upper volume of lubricant is placed on the upper side of the upper piston and a lower volume of lubricant is placed on the lower side of the lower piston. A drive mechanism separately controls an extension of the spring in both upper and lower axial directions, so as to individually extend each piston to self-meter lubricant over time/miles and at prescribed intervals. Thereby, each piston separately lubricates respective portions of the king pin joint.

9 Claims, 1 Drawing Sheet

(56) References Cited

U.S. PATENT DOCUMENTS

| | | | |
|---|---|---|---|
| 2,049,502 A * | 8/1936 | Hufferd | B62D 7/16 |
| | | | 280/93.511 |
| 3,542,392 A | 11/1970 | Cumming | |
| 3,559,027 A * | 1/1971 | Arsem | B60G 13/14 |
| | | | 180/65.31 |
| 4,032,829 A * | 6/1977 | Schenavar | B60G 13/14 |
| | | | 180/65.31 |
| 5,975,547 A | 11/1999 | Stroh et al. | |
| 6,071,032 A | 6/2000 | Link | |
| 6,113,118 A | 9/2000 | Zebolsky | |
| 6,293,022 B1 | 9/2001 | Chino et al. | |
| 8,764,034 B2 | 7/2014 | Well et al. | |
| 2003/0075892 A1* | 4/2003 | Tisch | B62D 7/18 |
| | | | 280/93.512 |
| 2005/0073123 A1 | 4/2005 | Kapaan et al. | |
| 2010/0264616 A1* | 10/2010 | Gell | B60G 3/20 |
| | | | 280/124.135 |
| 2013/0279835 A1* | 10/2013 | Akita | B22F 3/1146 |
| | | | 384/279 |
| 2016/0214453 A1 | 7/2016 | Tanahashi et al. | |

\* cited by examiner

SELF-LUBRICATING KING PIN JOINT WITH HOLLOW KING PIN

FIELD OF THE DEVICE

The present device relates to lubricating a king pin in a vehicle steer axle assembly. More particularly, the present device relates to self-lubricating a king pin joint in a vehicle steer axle assembly.

BACKGROUND OF THE DEVICE

A typical vehicle steer axle assembly has a steering knuckle that includes a body, steering arms, steer axle, a brake mounting plate, and a spindle for a wheel hub, along with bearings, a bushing, and a king pin (see, for example, U.S. Pat. No. 6,623,019 to Davis and U.S. Pat. No. 7,740,253 to Ziech).

FIG. 2 illustrates a prior art vehicle steer axle assembly 30 having a knuckle 32 that pivots about a king pin 34 on a generally vertically inclined steering axis A2. Top and bottom bushings 36a, 36b are inset (for example, pressed) within aligned top and bottom king pin portions 38a, 38b. Top and bottom king pin portions 38a, 38b are located within a kingpin bore 40 of the knuckle 32, so as to allow the knuckle 32 to rotate relative to the kingpin 34 and to limit axial and radial movement of the knuckle 32 relative to the kingpin 34. Each top and bottom king pin portion 38a, 38b and their respective bushings 36a, 36b create a king pin joint where a lubricant G (e.g., grease or oil) is disposed.

Although there are self-lubricating systems currently on the market, these systems are complex and costly. Therefore, most existing steer axles are typically required to be manually lubricated at prescribed intervals. However, it is known that manually lubricating a king pin joint is time consuming, because it has to be scheduled, tracked, and results in vehicle down time. Consequently, OEMs (original equipment manufacturers) and truck fleet owners dislike the added cost, wait times, and overall inefficiencies in maintaining their truck fleets.

Therefore, what is sought is a less complex and less costly self-lubricating system that would be invisible to fleet owners and to vehicle owners in general. Such a self-lubricating king pin joint system would have to reduce overall fleet/vehicle maintenance costs by minimizing maintenance, increasing uptime, and maintaining strong product durability. This system needs to be able to accurately dispense the lubricant and avoid distributing too much or too little lubricant at intervals. Such a system would be enhanced if it could be completely replaceable or retrofitable on existing steer axles. Thereby, the system would provide an additional aftermarket opportunity for both retrofitting steer axles or possibly being sold as a replaceable or retrofitable king pin kit. Consequently, such a system would make existing steer axles service free, where aftermarket sales and profitability would be enhanced.

SUMMARY

A self-lubricating king pin joint system has a knuckle with a bushing disposed therein. A hollow king pin is disposed through the center of the bushing, thereby forming a king pin joint between the bushing and the king pin. A controllable spring is positioned near the center of the hollow bore of the king pin. An upper piston and a lower piston are positioned on opposite sides of the spring, with an upper volume of lubricant being disposed above the upper side of the upper piston and a lower volume of lubricant being disposed below the lower side of the lower piston. Located within the king pin hollow bore is a drive mechanism that controls the spring to self-lubricant (i.e., self-meter lubricant) over time and at prescribed intervals to upper and lower portions of the king pin joint.

Further objects and advantages will be apparent from the following description and appended claims, reference being made to the accompanying drawings forming a part of a specification, wherein like reference characters designate corresponding parts of several views.

DESCRIPTION OF THE DEVICE

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
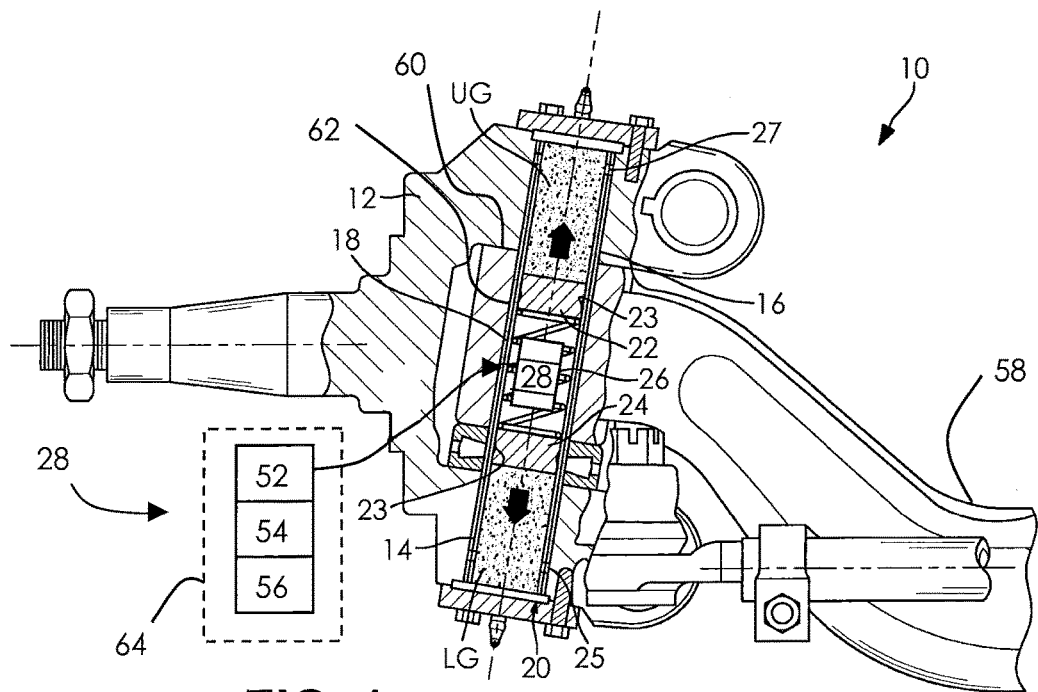
FIG. 1 is a partial cross sectional side view of a self-lubricating king pin joint system, with an inset view of one embodiment of a drive mechanism.
Figure 2:
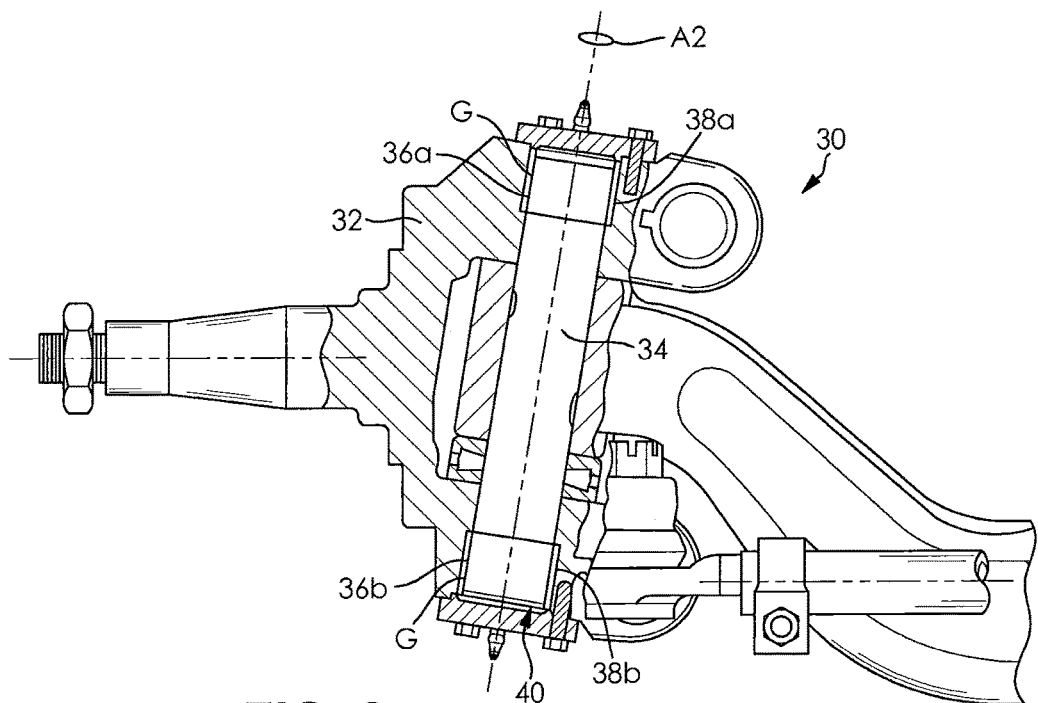
FIG. 2 is a partial cross sectional side view of a prior art king pin joint system.

FIG. 1 illustrates one embodiment of a self-lubricating king pin joint system 10 that comprises a knuckle 12, a king pin 14, and a bushing 16, wherein the bushing 16 is axially disposed through a center of the knuckle 12. In turn, the king pin 14 is axially disposed through a center of the bushing 16, thereby forming a king pin joint 18 therebetween. As shown, the king pin 14 is cylindrical in shape having a hollow, axially oriented continuous cylindrical bore 20 therethrough with an embodiment of a one-piece spring 26 axially disposed therein. This embodiment of the spring 26 has an upper axial side and a lower axial side, and is positioned in and near an axial center of the hollow king pin bore 20. Upper and lower pistons 22, 24 are respectively positioned on the upper axial side and the lower axial side of the spring 26. An upper volume of lubricant UG, such as grease, is disposed above an upper side of the upper piston 22. A lower volume of lubricant LG is disposed below a lower side of the lower piston 24. Seals 23 are provided on radial circumferences of both pistons 22, 24 to assure that the lubricant UG, LG does not leak onto and around the spring 26.

In the inset view of FIG. 1, one embodiment of a drive mechanism 28 is illustrated that is disposed near the axial center of the one-piece spring 26 within the hollow king pin bore 20. The drive mechanism 28 is in controllable contact with the spring 26. The drive mechanism 28 separately or simultaneously pushes lubricant UG, LG to upper and lower portions of the king pin joint 18, as seen by the up and down arrows. For example, one turn of the drive mechanism 28 expands the spring axially up and down, thereby pushing lubricants UG, LG at the same time. As also seen in the inset view of FIG. 1, the drive mechanism 28 may be electric and may comprise an integrated circuit clock 52, a battery 54, and a battery charging system 56, so as to precisely meter the lubricants UG, LG.

The battery charging system 56 charges the battery 54 over the lifetime of the drive mechanism 28. In turn, the battery 54 provides electrical power to the integrated circuit clock 52, which is programmed to drive the drive mechanism 28 to self-meter the lubricant UG, LG at predetermined times/miles to the king pin joint 18. Examples of predetermined times/miles for this self-metering of lubricant UG, LG could be once every year or every fifty thousand miles, for over the service life of an associated vehicle (not shown but common in the art). Optional lower and upper king pin lubrication holes 25, 27 may be utilized to assist in self-metering the lubricant UG, LG to the king pin joint 18. The lower and upper king pin lubrication holes 25, 27 are shown adjacent the axial ends of the king pin joint 18 in FIG. 1. The holes 25, 27, however, may be located elsewhere along the axial length of the king pin joint 18.

It is possible that the battery charging system 56 could be driven by a motion of a vehicle axle 58. As shown in FIG. 1, the vehicle axle 58 has a boss 60 that has a boss hole 62 therethrough. The bushing 16 is shown extending through the boss hole 62. The motion of the axle 58 would be a result, for example, of bumps in a highway that cause jounce and rebound based motion in a suspension (not shown but common in the art) of the vehicle. Besides new vehicles, the drive mechanism 28 could be provided as an aftermarket opportunity for both retrofitting OEM or fleet in-house steer axles or possibly being sold as a replaceable or retrofitable mechanism for existing competitor steer axles, while using a hollow king pin kit. To aid in an assembly of a whole replaceable or retrofitable drive mechanism 28, the assemblies could come in a cardboard tube 64, shown in dashed lines in the inset view of FIG. 1. Consequently, these assemblies 28, 64 could easily be loaded into the hollow king pin 14. This replaceable or retrofitable electric drive mechanism 28, with or without the cardboard tube 64, would make for a simplified assembly process at a manufacturing facility.

The self-lubricating king pin joint system 10 takes advantage of empty space within the hollow king pin 14, which presents no materially adverse impact on product performance or structural durability. By making the king pin 14 hollow, it provides unused space (i.e., the hollow portion of the king pin 14) to place a reserve of fresh lubricant UG, LG that can be continually self-metered radially outward from within to critical lubrication points of the king pin joint 18. Over time, the self-lubricating king pin joint system 10 maintains high levels of durability without a maintenance burden. With the two pistons 22, 24 placed in the middle area of the king pin bore 20, the spring 26, which is light in construction, pushes fresh lubricant UG, LG outward over time/miles. The integrated circuit clock 52, battery 54, and the battery charging mechanism 56 are programmed to push (i.e., meter) a specified amount of lubricant UG, LG outward and at specific times/miles over the service life of the self-lubricating king pin joint system 10.

While one embodiment of an electric drive mechanism is described above and depicted in the figures, the drive mechanism can also be entirely mechanical. By way of example, the drive mechanism can use a biasing member, such as a spring. The spring can be initially wound or otherwise tensioned so that it slowly and steadily releases it energy to bias outwardly the upper and lower pistons 22, 24 in the hollow king pin 14.

In order to avoid distributing too much lubricant at each lubricant interval, pressure sensing (not shown) can be added to integrated circuitry (not shown) of the electric drive mechanism 28 and perhaps even a displacement measurement (not shown) in the electric drive mechanism (not shown) to ensure that relatively accurate and measured amounts of lubricant are distributed each time.

In accordance with the provisions of the patent statutes, the principles and modes of operation of this device have been described and illustrated in its preferred embodiments. However, it must be understood that the device may be practiced otherwise than specifically explained and illustrated without departing from its spirit or scope.

What is claimed is:

1. A self-lubricating king pin joint system, comprising:
a knuckle with a bushing disposed therein;
a king pin disposed through a center of the bushing, wherein a king pin joint is formed between the bushing and the king pin;
a controllable spring positioned near a center of a hollow bore of the king pin;
an upper piston and a lower piston positioned on opposite sides of the controllable spring;
an upper volume of lubricant disposed above an upper side of the upper piston and a lower volume of lubricant disposed below a lower side of the lower piston;
a drive mechanism positioned within the king pin hollow bore that controls the spring to self-lubricate the king pin joint.

2. The self-lubricating king pin joint system of claim 1, further comprising lower and upper king pin lubrication holes to assist in self-lubricating the lubricant to the king pin joint.

3. The self-lubricating king pin joint system of claim 2, wherein the lower and upper king pin lubrication holes are located adjacent axial ends of the king pin joint.

4. The self-lubricating king pin joint system of claim 1, further comprising seals disposed on radial circumferences of both pistons.

5. The self-lubricating king pin joint system of claim 1, wherein the drive mechanism includes a battery charging system.

6. The self-lubricating king pin joint system of claim 1, wherein a battery charging system provides charging of a battery over a lifetime of the drive mechanism; and wherein the battery provides electrical power to an integrated circuit clock that is programmed to drive the drive mechanism to self-lubricate the king pin joint at predetermined times/miles.

7. The self-lubricating king pin joint system of claim 1, wherein the drive mechanism is disposed adjacent the axial center of the spring within the hollow king pin bore.

8. A method of self-lubricating a king pin joint, comprising:
providing a knuckle with a bushing disposed therein;
providing a king pin disposed through a center of the bushing, wherein a king pin joint is formed between the king pin and the bushing;
providing a controllable spring positioned near a center of a hollow bore of the king pin;
providing an upper and a lower piston positioned on opposite sides of the controllable spring;
providing an upper volume of lubricant disposed above an upper side of the upper piston and a lower volume of lubricant disposed below a lower side of the lower piston; and
providing a drive mechanism positioned within the king pin hollow bore, wherein the drive mechanism movably controls the spring, so as to move each piston away from the center of the hollow interior of the king pin to self-meter the upper and lower volumes of lubricant into upper and lower portions of the king pin joint.

9. The method of self-lubricating a king pin joint of claim 8, wherein the lubricant communicates out of lubrication holes to the upper and lower portions of the king pin joint.

\* \* \* \* \*